(12) United States Patent
Ito et al.

(10) Patent No.: US 8,782,428 B2
(45) Date of Patent: Jul. 15, 2014

(54) ENCRYPTION DEVICE AND ENCRYPTION METHOD

(75) Inventors: Mikio Ito, Kawasaki (JP); Hidejirou Daikokuya, Kawasaki (JP); Kazuhiko Ikeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 472 days.

(21) Appl. No.: 12/591,797

(22) Filed: Dec. 1, 2009

(65) Prior Publication Data
US 2010/0083005 A1   Apr. 1, 2010

Related U.S. Application Data

(63) Continuation of application No. PCT/JP2007/061644, filed on Jun. 8, 2007.

(51) Int. Cl.
*H04L 29/06* (2006.01)

(52) U.S. Cl.
USPC .......................................... 713/189; 713/193

(58) Field of Classification Search
USPC ........................................................ 713/193
See application file for complete search history.

(56) References Cited

U.S. PATENT DOCUMENTS

| | | |
|---|---|---|
| 2004/0172538 A1 | 9/2004 | Satoh et al. |
| 2005/0160044 A1 | 7/2005 | Hori et al. |
| 2005/0204154 A1 | 9/2005 | Osaki |
| 2006/0064604 A1 | 3/2006 | Osaki |
| 2006/0085488 A1 | 4/2006 | Kitsuregawa et al. |
| 2006/0143510 A1 | 6/2006 | Ikeda et al. |
| 2006/0236129 A1 | 10/2006 | Mimatsu |
| 2007/0110227 A1 | 5/2007 | Yokouchi |
| 2007/0174634 A1* | 7/2007 | Plotkin et al. ................. 713/189 |
| 2008/0101605 A1* | 5/2008 | Kitamura et al. ............. 380/239 |
| 2009/0046858 A1* | 2/2009 | Iyer et al. ...................... 380/259 |
| 2010/0088556 A1 | 4/2010 | Ikeda et al. |

FOREIGN PATENT DOCUMENTS

| | | |
|---|---|---|
| JP | 2002-215462 | 8/2002 |
| JP | 2003-114768 | 4/2003 |
| JP | 2003-256286 | 9/2003 |
| JP | 2004-080202 | 3/2004 |
| JP | 2004-201038 | 7/2004 |
| JP | 2005-107855 | 4/2005 |
| JP | 2005-303981 | 10/2005 |

(Continued)

OTHER PUBLICATIONS

International Search Report for PCT/JP20017/061644, mailed Sep. 11, 2007.

(Continued)

*Primary Examiner* — Edward Zee
*Assistant Examiner* — Chi Nguy
(74) *Attorney, Agent, or Firm* — Staas & Halsey LLP

(57) ABSTRACT

Even if failure, or the like, occurs during the encryption process, the encryption process is surely resumed. A flag changing unit changes an encryption flag of one disk to being encrypted after an encryption request is received and before the encryption of the data stored on the one disk is started. The flag changing unit changes the encryption flag of the one disk to having been encrypted and changes the encryption flag of the other disk to being encrypted before copying the encrypted data from the one disk to the other disk is started. The flag changing unit changes the encryption flag of the other disk to having been encrypted after copying to the other disk is completed.

3 Claims, 7 Drawing Sheets

(56) References Cited

FOREIGN PATENT DOCUMENTS

| JP | 2006-119822 | 5/2006 |
|---|---|---|
| JP | 2006-185108 | 7/2006 |
| JP | 2006-302259 | 11/2006 |
| JP | 2007-60627 | 3/2007 |

OTHER PUBLICATIONS

Japanese Office Action mailed Jun. 21, 2011 in corresponding Japanese Patent Application 2009-517674.
Decision of Rejection, mailed Sep. 27, 2011, in corresponding Japanese Application No. 2009-517674 (6 pp.).

* cited by examiner

FIG.2

| DISK ID | ENCRYPTION FLAG | GROUP ID |
|---------|-----------------|----------|
| 001 | 1 | 01 |
| 002 | 0 | 01 |
| 003 | 2 | 02 |
| ⋮ | ⋮ | ⋮ |

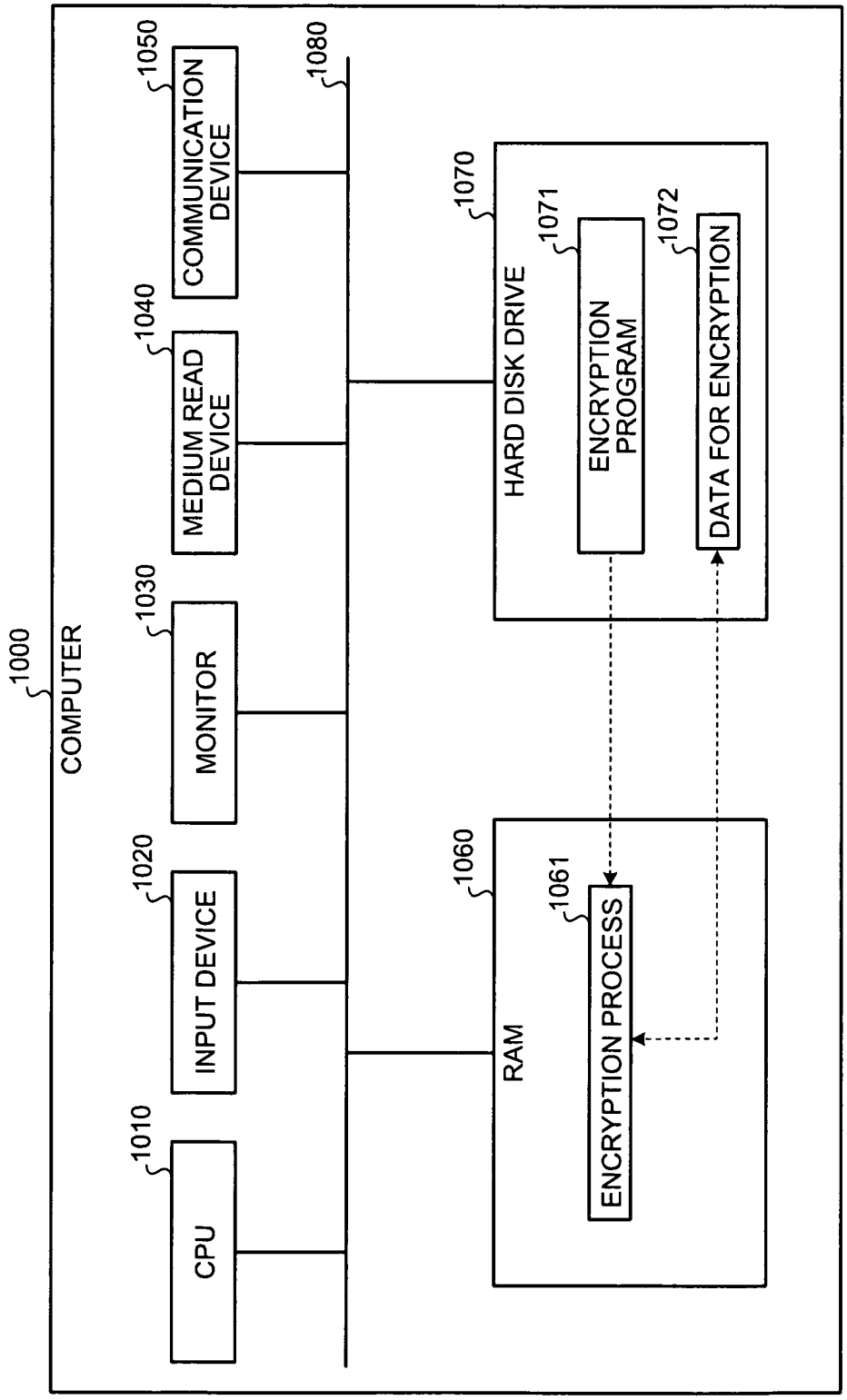

ENCRYPTION DEVICE AND ENCRYPTION METHOD

CROSS-REFERENCE TO RELATED APPLICATION

This application is a continuation of International Application No. PCT/JP2007/061644, filed on Jun. 8, 2007, the entire contents of which are incorporated herein by reference.

FIELD

The embodiments discussed herein are directed to an encryption device and an encryption method that are useful for encrypting data stored in a plurality of storage media that belongs to a Redundant Array of Inexpensive Disks (RAID) group.

BACKGROUND

Ensuring confidentiality of information managed by a computer system is a very significant issue for a company, or the like, that possesses the information. A technology for encrypting data stored in a storage device is known as a technology for improving the confidentiality of information. Japanese Laid-open Patent Publication No. 2005-107855, Japanese Laid-open Patent Publication No. 2006-302259 and Japanese Laid-open Patent Publication No. 2004-201038 described below disclose technologies for encrypting data stored in a storage medium such as a magnetic disk. Generally, when the data stored in the storage medium is encrypted, the state of progress of the encryption process is managed by a controller that controls the encryption process.

If information for managing the state of progress of the encryption process is lost during the encryption process due to, for example, failure of the controller, it is impossible to distinguish between the data that has been encrypted and the data that has not been encrypted among the data stored in the storage medium. In this case, the encryption process cannot be resumed or the data cannot be correctly decoded; therefore, the data cannot be restored.

SUMMARY

According to an aspect of an embodiment of the invention, an encryption device includes an encrypting unit that encrypts data stored in a first storage medium and writes the encrypted data to a second storage medium, the first storage medium and a third storage medium belonging to a Redundant Array of Inexpensive Disks (RAID) group; a changing unit that changes encryption variables for the first, second, third storage medium, respectively, the encryption variables each indicating a state of progress of encryption in the corresponding storage media; and a copying unit that copies the encrypted data to the third storage medium in which unencrypted data is stored. The changing unit changes, before the encryption is started by the encrypting unit, the encryption variable for the third storage medium from information that is indicative of being unencrypted to information that is indicative of being encrypted, changes, after the encryption is completed by the encrypting unit, the encryption variable for the third storage medium to information that is indicative of having been encrypted and changes the encryption variable for the second storage medium to which the encrypted data is to be copied by the copying unit from information that is indicative of being unencrypted to information that is indicative of being encrypted, and changes, after the copying is completed by the copying unit, the encryption variable for the second storage medium to which the encrypted data is copied by the copying unit to information that is indicative of having been encrypted.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a data structure diagram of a flag table;

FIG. 5 is a schematic diagram that illustrates the state where the encrypted data on the disk 40b is being copied to a disk 40a;

FIG. 9 is a function configuration diagram of a computer that executes an encryption program.

DESCRIPTION OF EMBODIMENT(S)

Preferred embodiments of the present invention will be explained with reference to accompanying drawings.

[a] First Embodiment

Figure 1:
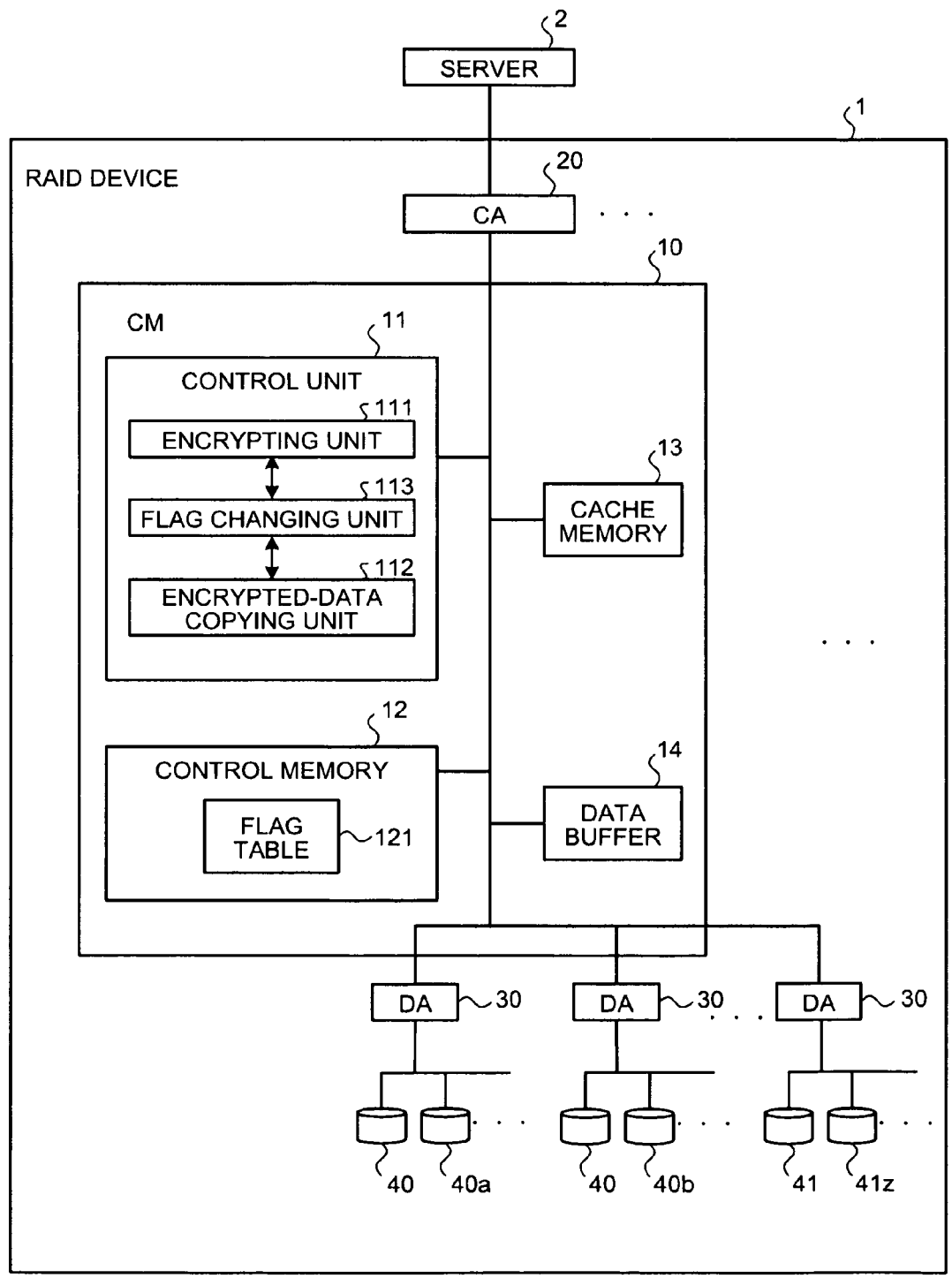
FIG. 1 is a configuration diagram of a RAID device.

First, an explanation will be given of a configuration of a RAID device in accordance with a first embodiment. FIG. 1 is a configuration diagram of the RAID device. A RAID device 1 is a storage device that controls a plurality of disks (storage media) that belongs to a RAID group at a RAID 1 level, and it can store data in an encrypted state. RAID is a technology for controlling disks and improving processing performance as well as preventing data loss due to disk failure. RAID has defined levels from RAID 0 to RAID 6 are defined for the. RAID 1 used in the present embodiment is a level at which data is simultaneously written to two disks and is also called mirroring.

As depicted in FIG. 1, the RAID device 1 includes a Channel Adapter (CA) 20 that controls the connection with a server 2, a Controller Module (CM) 10 that controls encryption of data stored in disks 40, a Device Adapter (DA) 30 that controls the connection between the CM 10 and the disks 40, the disks 40 that belong to the RAID group at RAID 1 level, and a spare disk 41 that does not belong to the RAID group. The CM 10 includes a control unit 11, a control memory 12 in which various types of data, such as a flag table 121, and applications are stored, a cache memory 13, and a data buffer 14 in which target data for an encryption process or a copying process is temporarily stored. In the following descriptions, the two disks that belong to the RAID group at the RAID 1 level are sometimes described as the disk 40a and the disk 40b to separately explain them.

An explanation will be given of the data structure of the flag table 121 with reference to FIG. 2. FIG. 2 is a data structure diagram of the flag table. The flag table 121 stores therein, for example, a disk ID, an encryption flag, and a group ID as data items. An identification code for uniquely identifying the disk 40 is stored in the disk ID, an encryption variable that indicates the state of progress of the encryption process is stored in the encryption flag, and an identification code for uniquely identifying the RAID group to which a disk belongs is stored in the group ID. A variable indicated by, for example, "0", "1", or "2" is stored in the encryption flag. The variable "0" indicates that data stored in the disk is in a state of being unencrypted, the variable "1" indicates that data stored in the disk is in a state of being encrypted, and the variable "2" indicates that data stored in the disk is in a state of having been encrypted.

An area in which the encryption flag is stored is not limited to the flag table 121. For example, the encryption flag can be stored in a disk configuration table that controls the configuration of each disk and is stored in the control memory 12 or can be stored in a specific area that is among memory areas of each of the disks 40 and is not used by a user.

The control unit 11 depicted in FIG. 1 includes an encrypting unit 111, an encrypted-data copying unit 112, and a flag changing unit 113.

The encrypting unit 111 determines, on the basis of a group ID contained in an encryption request received from the server 2, a RAID group corresponding to the group ID as a target for the encryption process, encrypts data stored in one of the two disks 40a and 40b, for example, the disk 40b, that belong to the RAID group, and writes the encrypted data to the disk 40b. In the following descriptions, as an example, an explanation will be given of a case where the data stored in the disk 40b of the two disks 40a and 40b is encrypted by the encrypting unit 111. The disk to be encrypted by the encrypting unit 111 is not limited to the disk 40b. The disk to be encrypted by the encrypting unit 111 can be either the disk 40a or 40b. For example, it is possible that the disk ID is contained in the encryption request and a disk to be encrypted is determined to be either the disk 40a or 40b on the basis of the disk ID, or the disk to be encrypted is pre-set for each group. Furthermore, a unit of target data for the encryption process can be a unit of a disk, a unit of partition, or a unit of volume.

The encrypted-data copying unit 112 copies to the disk 40a the data in the disk 40b encrypted by the encrypting unit 111 that is the other disk that belongs to the same RAID group.

The flag changing unit 113 changes the encryption flag in the manner described below. The flag changing unit 113 changes the encryption flag corresponding to the disk 40b from "0", which is indicative of being unencrypted, to "1", which is indicative of being encrypted, during the time between when the encryption request is received and when the encryption of the data stored on the disk 40b is started.

The flag changing unit 113 changes the encryption flag corresponding to the disk 40b from "1", which is indicative of being encrypted, to "2", which is indicative of having been encrypted, and changes the encryption flag corresponding to the disk 40a from "0", which is indicative of being unencrypted, to "1", which is indicative of being encrypted, during the time between when the encryption of the data stored in the disk 40b is completed and when the copying of the data to the disk 40a is started.

After copying to the disk 40a is completed, the flag changing unit 113 changes the encryption flag corresponding to the disk 40a from "1", which is indicative of being encrypted, to "2", which is indicative of having been encrypted.

Figure 3:
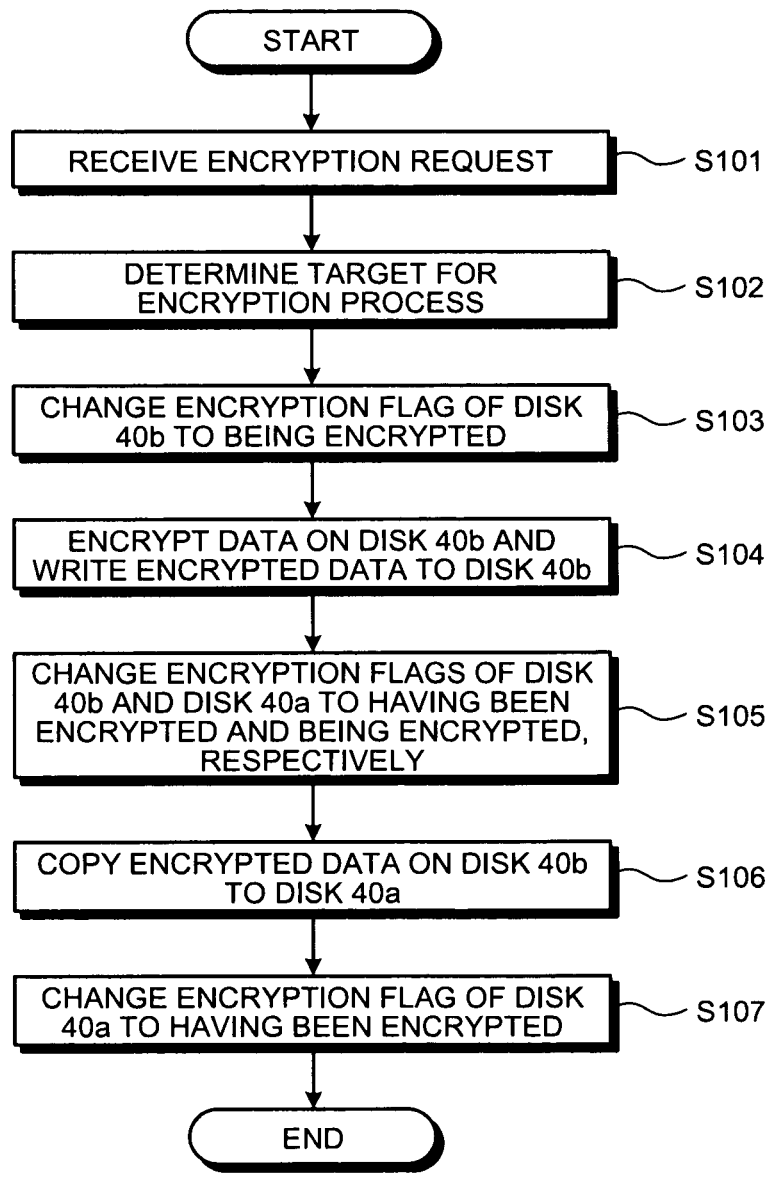
FIG. 3 is a flowchart that represents a procedure of encryption performed by the RAID device in accordance with a first embodiment.

Next, an explanation will be given of a procedure performed by the RAID device 1 in accordance with the first embodiment with reference to FIG. 3. FIG. 3 is a flowchart that represents a procedure of encryption performed by the RAID device in accordance with the first embodiment. In the procedure, an explanation will be given of a procedure performed when the data stored on the disk 40a and the disk 40b that belong to the RAID group at the RAID 1 level is encrypted.

First, upon receiving the encryption request transmitted from the server 2 (Step S101), the encrypting unit 111 of the RAID device 1 determines, by using the group ID contained in the encryption request, the two disks 40a and 40b corresponding to the group ID as targets for the encryption process (Step S102).

The flag changing unit 113 of the RAID device 1 then changes the encryption flag corresponding to the disk 40b from "0", which is indicative of being unencrypted, to "1", which is indicative of being encrypted (Step S103).

Figure 4:
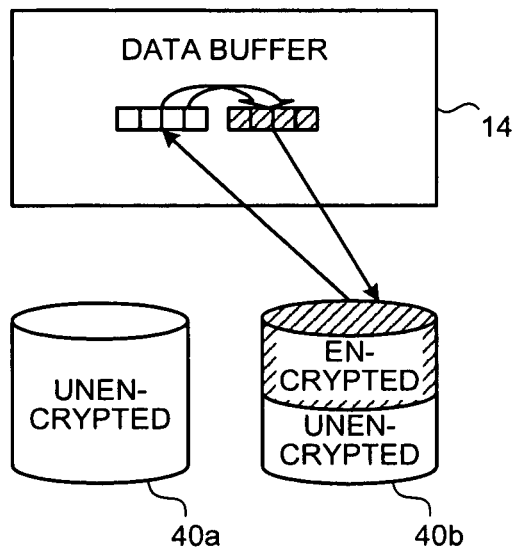
FIG. 4 is a schematic diagram that illustrates the state where the data stored on a disk 40b is being encrypted.

The encrypting unit 111 of the RAID device 1 then encrypts the data stored in the disk 40b and writes the encrypted data to the disk 40b (Step S104). The state of each of the disks 40a and 40b at Step S104 is illustrated in FIG. 4. FIG. 4 is a schematic diagram that illustrates the state where the data stored on the disk 40b is being encrypted.

When the encryption of the data stored on the disk 40b is completed, the flag changing unit 113 of the RAID device 1 changes the encryption flag corresponding to the disk 40b to "2", which is indicative of having been encrypted, and changes the encryption flag corresponding to the disk 40a from "0", which is indicative of being unencrypted to "1", which is indicative of being encrypted (Step S105).

Figure 5:
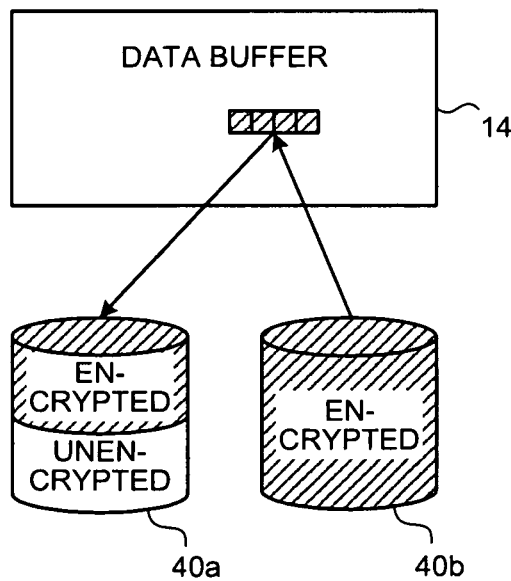

The encrypted-data copying unit 112 of the RAID device 1 then copies to the disk 40a the encrypted data in the disk 40b encrypted at Step S104 (Step S106). The state of each of the disks 40a and 40b at Step S106 is illustrated in FIG. 5. FIG. 5 is a schematic diagram that illustrates the state where the encrypted data on the disk 40b is being copied to the disk 40a.

When copying to the disk 40a is completed, the flag changing unit 113 of the RAID device 1 changes the encryption flag corresponding to the disk 40a to "2", which is indicative of having been encrypted (Step S107).

In this manner, the encryption flag corresponding to each of the disks is changed in accordance with the state of progress of the encryption process so that even if, for example, the encryption process is stopped in mid-course due to failure of the CM 10, or the like, the encryption can be surely resumed by referring to the encryption flag.

Specifically, if the encryption flag of the disk 40a is "0", which is indicative of being unencrypted, and the encryption flag of the disk 40b is "1", which is indicative of being encrypted, the data in the disk 40a is copied to the disk 40b and then Step S104 and subsequent steps as described above are performed. In this case, it is possible that the data stored in the disk 40a is encrypted and the encrypted data is written to the disk 40b without copying the data in the disk 40a to the disk 40b.

If the encryption flag of the disk 40a is "0", which is indicative of being unencrypted, or "1", which is indicative of being encrypted, and if the encryption flag of the disk 40b is "2", which is indicative of having been encrypted, Step S106 and subsequent steps as described above are performed. If the encryption flags of both the disks 40*a* and 40*b* are "2", which is indicative of having been encrypted, the encryption process is terminated.

As described above, the RAID device 1 in accordance with the first embodiment performs the encryption process while either a disk in a state of being unencrypted or a disk in a state of having been encrypted is present and changes the encryption flag corresponding to each disk in accordance with the state of progress of the encryption process. In this manner, even if failure, or the like, occurs during the encryption process, the encryption process can be surely resumed by using either the disk in a state of being unencrypted or the disk in a state of having been encrypted.

[b] Second Embodiment

An explanation will be given of a second embodiment. The configuration of the RAID device in accordance with the second embodiment is the same as that of the RAID device in accordance with the first embodiment depicted in FIG. 1. The second embodiment is different from the first embodiment in that the encrypted data is written to a different disk. Specifically, they are different from each other in that, for example, if the data stored in the disk 40*b* is encrypted, the encrypted data is written to the same disk 40*b* in accordance with the first embodiment, while if the data stored in the disk 40*b* is encrypted, the encrypted data is written to the spare disk 41 that does not belong to the RAID group in accordance with the second embodiment. In the following descriptions, the configuration and operation of the RAID device in accordance with the second embodiment will be explained by focusing on the different point between the first embodiment and the second embodiment. In the same manner as the first embodiment, the two disks 40 that belong to the RAID group at the RAID 1 level are sometimes described as the disk 40*a* and the disk 40*b* to separately explain them.

The encrypting unit 111 determines, on the basis of the group ID contained in the encryption request received from the server 2, the two disks 40*a* and 40*b* that belong to the RAID group corresponding to the group ID as targets for the encryption process, and the encrypting unit 111 selects one disk 41*z* to be used for the encryption process from the spare disks 41, thereby adding the disk 41*z* to the targets for the encryption process. The encrypting unit 111 encrypts the data stored in the disk 40*b* of the two disks 40*a* and 40*b* and writes the encrypted data to the disk 41*z*. The disk to be encrypted by the encrypting unit 111 can be either the disk 40*a* or 40*b*. For example, it is possible that the disk ID is contained in the encryption request and a disk to be encrypted is determined to be either the disk 40*a* or 40*b* on the basis of the disk ID, or the disk to be encrypted is pre-set for each group.

The encrypted-data copying unit 112 copies to the disk 40*a* and the disk 40*b* the data in the disk 41*z* encrypted by the encrypting unit 111.

The flag changing unit 113 changes the encryption flag in the manner described below. The flag changing unit 113 changes the encryption flag corresponding to the disk 41*z* from "0", which is indicative of being unencrypted, to "1", which is indicative of being encrypted, during the time between when the encryption request is received and when the encryption of the data stored in the disk 40*b* is started.

The flag changing unit 113 changes the encryption flag corresponding to the disk 41*z* from "1", which is indicative of being encrypted, to "2", which is indicative of having been unencrypted, and changes the encryption flag corresponding to the disk 40*b* from "0", which is indicative of being unencrypted, to "1", which is indicative of being encrypted, during the time between when the encryption of the data stored in the disk 40*b* is completed and when the copying of the encrypted data stored in the disk 41*z* to the disk 40*b* is started.

The flag changing unit 113 changes the encryption flag corresponding to the disk 40*b* from "1", which is indicative of being encrypted, to "2", which is indicative of having been unencrypted, and changes the encryption flag corresponding to the disk 40*a* from "0", which is indicative of being unencrypted, to "1", which is indicative of being encrypted, during the time between when the copying to the disk 40*b* is completed and when the copying to the disk 40*a* is started.

After copying to the disk 40*a* is completed, the flag changing unit 113 changes the encryption flag corresponding to the disk 40*a* from "1", which is indicative of being encrypted, to "2", which is indicative of having been encrypted.

Figure 6:
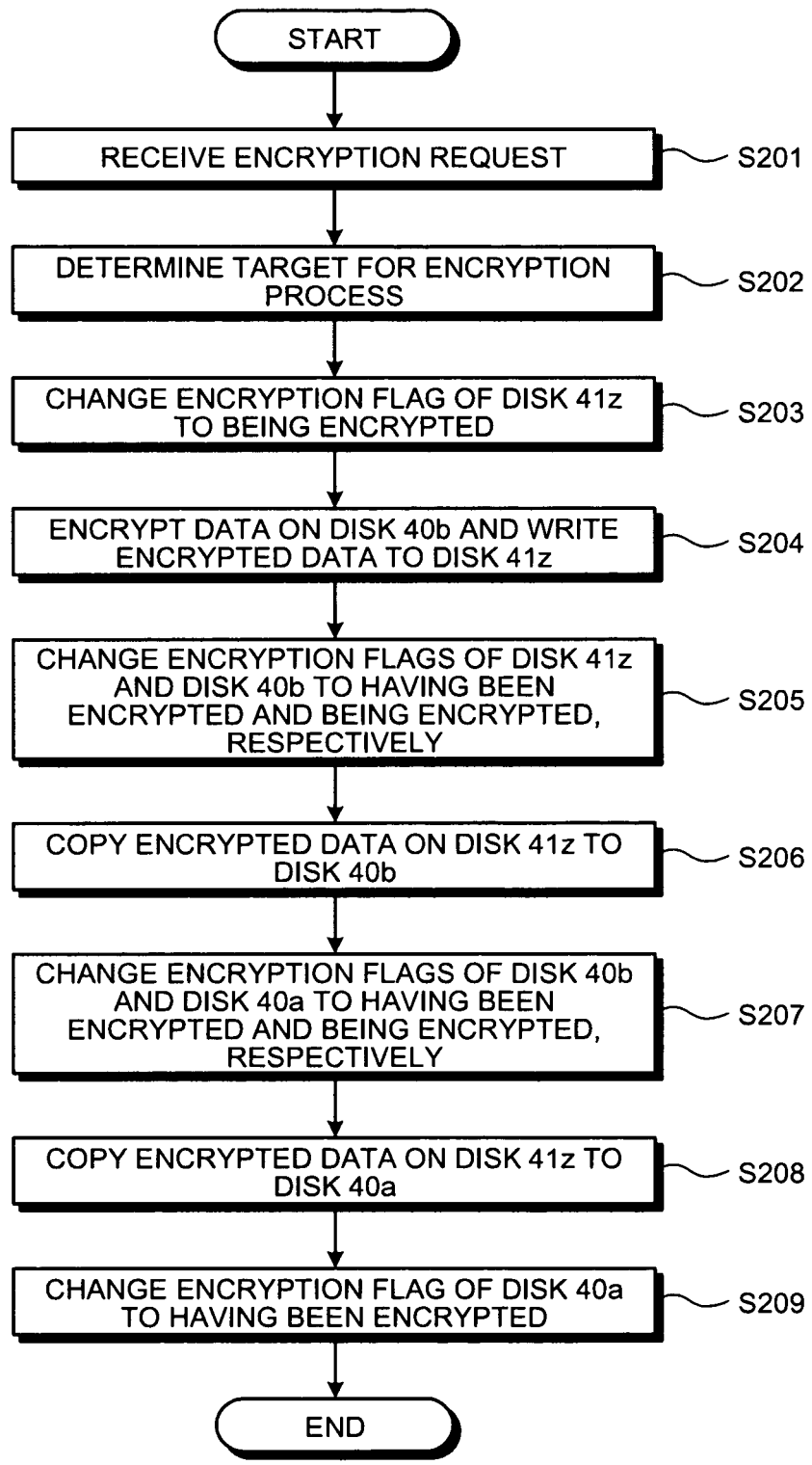
FIG. 6 is a flowchart that represents a procedure of encryption performed by the RAID device in accordance with a second embodiment.

Next, an explanation will be given of a procedure performed by the RAID device 1 in accordance with the second embodiment with reference to FIG. 6. FIG. 6 is a flowchart that represents a procedure of encryption performed by the RAID device in accordance with the second embodiment. In the procedure, an explanation will be given of a procedure performed when the data stored in the disk 40*a* and the disk 40*b* that belong to the RAID group at the RAID 1 level is encrypted.

First, upon receiving the encryption request transmitted from the server 2 (Step S201), the encrypting unit 111 of the RAID device 1 determines, by using the group ID contained in the encryption request, the two disks 40*a* and 40*b* corresponding to the group ID as targets for the encryption process, and the encrypting unit 111 selects one disk 41*z* to be used for the encryption process from the spare disks 41, thereby adding the disk 41*z* to the targets for the encryption process (Step S202).

The flag changing unit 113 of the RAID device 1 then changes the encryption flag corresponding to the disk 41*z* from "0", which is indicative of being unencrypted, to "1", which is indicative of being encrypted (Step S203).

Figure 7:
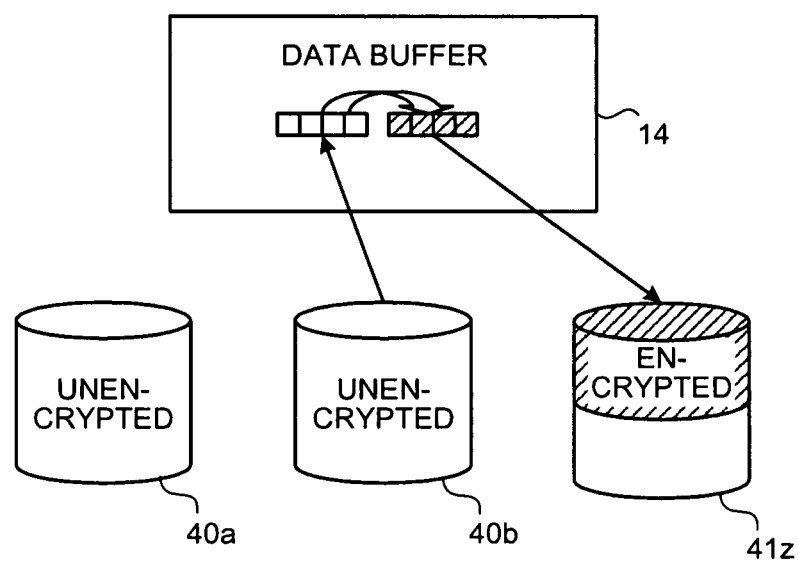
FIG. 7 is a schematic diagram that illustrates the state where the data stored on the disk 40b is being encrypted and written to a disk 41z.

The encrypting unit 111 of the RAID device 1 then encrypts the data stored in the disk 40*b* and writes the encrypted data to the disk 41*z* (Step S204). The state of each of the disks 40*a*, 40*b*, and 41*z* at Step S204 is illustrated in FIG. 7. FIG. 7 is a schematic diagram that illustrates the state where the data stored in the disk 40*b* is being encrypted and written to the disk 41*z*.

When the encryption of the data stored in the disk 40*b* is completed, the flag changing unit 113 of the RAID device 1 changes the encryption flag corresponding to the disk 41*z* to "2", which is indicative of having been encrypted, and changes the encryption flag corresponding to the disk 40*b* from "0", which is indicative of being unencrypted to "1", which is indicative of being encrypted (Step S205).

Figure 8:
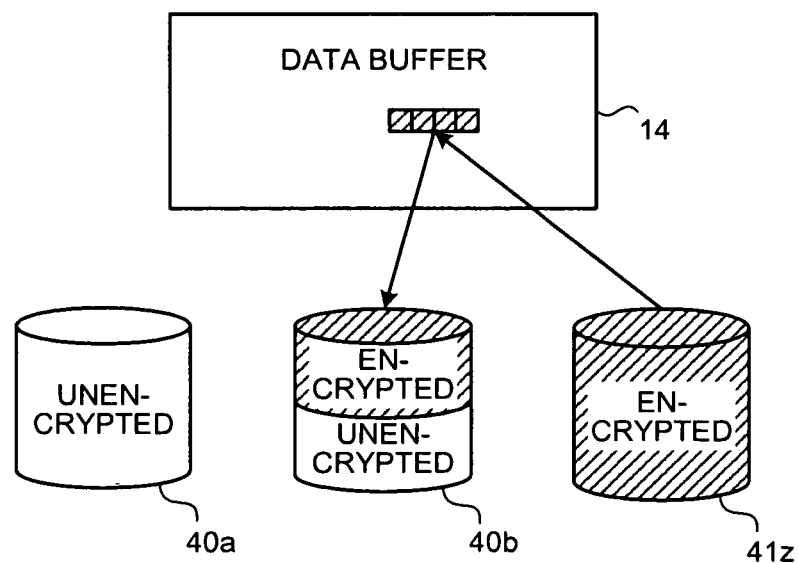
FIG. 8 is a schematic diagram that illustrates the state where the encrypted data on the disk 41z is being copied to the disk 40b.

The encrypted-data copying unit 112 of the RAID device 1 then copies to the disk 40*b* the encrypted data written to the disk 41*z* at Step S204 (Step S206). The state of each of the disks 40*a*, 40*b*, and 41*z* at Step S206 is illustrated in FIG. 8. FIG. 8 is a schematic diagram that illustrates the state where the encrypted data on the disk 41*z* is being copied to the disk 40*b*.

When copying to the disk 40*b* is completed, the flag changing unit 113 of the RAID device 1 changes the encryption flag corresponding to the disk 40*b* to "2", which is indicative of having been encrypted, and changes the encryption flag corresponding to the disk 40*a* from "0", which is indicative of being unencrypted, to "1", which is indicative of being encrypted (Step S207).

The encrypted-data copying unit 112 of the RAID device 1 then copies to the disk 40a the encrypted data written to the disk 41z at Step S204 (Step S208).

When copying to the disk 40a is completed, the flag changing unit 113 of the RAID device 1 changes the encryption flag corresponding to the disk 40a to "2", which is indicative of having been encrypted (Step S209).

In this manner, the encryption flag corresponding to each disk is changed in accordance with the state of progress of the encryption process so that even if, for example, the encryption process is stopped in mid-course due to failure of the CM 10, or the like, the encryption can be surely resumed by referring to the encryption flag.

Specifically, if the encryption flags of the disk 40a and the disk 40b are "0", which is indicative of being unencrypted, and the encryption flag of the disk 41z is "1", which is indicative of being encrypted, Step S204 and subsequent steps as described above are performed.

If the encryption flag of the disk 40a is "0", which is indicative of being unencrypted, the encryption flag of the disk 40b is "1", which is indicative of being encrypted, and the encryption flag of the disk 41z is "2", which is indicative of having been encrypted, Step S206 and subsequent steps as described above are performed.

If the encryption flag of the disk 40a is "0", which is indicative of being unencrypted, or "1", which is indicative of being encrypted, and if the encryption flags of both the disk 40b and the disk 41z are "2", which is indicative of having been encrypted, Step S208 and subsequent steps as described above are performed.

If the encryption flags of all of the disks 40a, the disk 40b, and the disk 41z are "2", which is indicative of having been encrypted, the encryption process is terminated.

As described above, the RAID device 1 in accordance with the second embodiment performs the encryption process while either a disk in a state of being unencrypted or a disk in a state of having been encrypted is present and changes the encryption flag corresponding to each disk in accordance with the state of progress of the encryption process. In this manner, even if failure, or the like, occurs during the encryption process, the encryption process can be surely resumed by using either the disk in a state of being unencrypted or the disk in a state of having been encrypted.

Furthermore, in the RAID device 1 in accordance with the second embodiment, if failure, or the like, occurs during the encryption of the spare disk 41, because the disks 40a and 40b that belong to the RAID group are maintained in an unencrypted state, the encryption process can be easily resumed only by replacing the spare disk 41 with a different spare disk.

In the second embodiment described above, an explanation is given of the case where the plurality of disks 40 to be encrypted belong to the RAID group at the RAID 1 level; however, the present invention can be applied to the case where they belong to a RAID group at a different RAID level. For example, if the present invention is applied to the plurality of disks 40 that belong to a RAID group at any one of RAID 4 level to 6 level, the spare disks 41 are prepared corresponding to the number of disks that belong to the RAID group, whereby the encrypted data on each of the disks 40 that belong to the RAID group is written to the spare disk 41 corresponding to each of the disks 40 and then the encrypted data is copied from the spare disk 41 to the disk 40 that belongs to the RAID group.

Finally, the configuration of the RAID device 1 in accordance with each of the embodiments as depicted in FIG. 1 can be changed in various manners without departing from the scope of the present invention. For example, the functions of the control unit 11 of the RAID device 1 can be implemented as software and executed by a computer, whereby the functions equivalent to the RAID device 1 can be performed. An example of a computer that executes an encryption program 1071 in which the functions of the control unit 11 are implemented as software will be depicted below.

FIG. 9 is a function configuration diagram of a computer that executes the encryption program. A computer 1000 is configured by connecting, via a bus 1080, a central processing unit (CPU) 1010 that executes various types of arithmetic processes, an input device 1020 that receives an input of data from a user, a monitor 1030 that displays various types of information, a medium read device 1040 that reads programs, and the like, from a storage medium, a communication device 1050 that transmits and receives data to and from a different computer via a network, a Random Access Memory (RAM) 1060 in which various types of information are temporarily stored, and a hard disk drive 1070.

The encryption program 1071 that has the same functions as the control unit 11 depicted in FIG. 1 and data for encryption 1072 corresponding to various types of data used by the encryption program 1071 are stored in the hard disk drive 1070. The data for encryption 1072 can be distributed as appropriate and stored in a different computer connected via a network.

The CPU 1010 reads the encryption program 1071 from the hard disk drive 1070 and loads the read encryption program 1071 into the RAM 1060 so that the encryption program 1071 functions as an encryption process 1061. The encryption process 1061 loads information, or the like, read from the data for encryption 1072 into an area assigned to the encryption process 1061 on the RAM 1060 as appropriate and performs various types of data processing on the basis of the loaded data, or the like.

The encryption program 1071 does not need to be necessarily stored in the hard disk drive 1070. This program stored in a storage medium, such as a CD-ROM, can be read and executed by the computer 1000. Furthermore, this program can be stored in a different computer (or server) connected to the computer 1000 via a public line, the Internet, a Local Area Network (LAN), a Wide Area Network (WAN), or the like, and can be read and executed by the computer 1000.

According to an embodiment of the present invention, the encryption process can be performed while either a disk in a state of being unencrypted or a disk in a state of having been encrypted is present, and the encryption flag corresponding to each disk can be changed in accordance with the state of progress of the encryption process, so that even if failure, or the like, occurs during the encryption process, the encryption process can be resumed by using either the disk in a state of being unencrypted or the disk in a state of having been encrypted. Therefore, according to the present invention, the effect is achieved such that, even if failure, or the like, occurs during the encryption process, the encryption process can surely be resumed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An encryption device comprising:
   an encrypting unit that encrypts data stored in a storage medium that belongs to a Redundant Array of Inexpensive Disks (RAID) group, and writes the encrypted data to a spare storage medium that does not belong to the RAID group;
   a copying unit that copies, after the writing is completed by the encrypting unit, the encrypted data written to the spare storage medium by the encrypting unit, to the storage medium; and
   a changing unit that
      changes, before the encryption is started by the encrypting unit, encryption information for the spare storage medium from information that is indicative of being unencrypted to information that is indicative of being encrypted,
      changes, after the writing is completed by the encrypting unit, the encryption information for the spare storage medium from the information that is indicative of being encrypted to information that is indicative of having been encrypted,
      changes encryption information for the storage medium from the information that is indicative of being unencrypted to the information that is indicative of being encrypted, and
      changes, after the copying is completed by the copying unit, the encryption information for the storage medium from the information that is indicative of being encrypted to the information that is indicative of having been encrypted,
   wherein the spare storage medium is one of a plurality of spare storage mediums that do not belong to the RAID group and are prepared corresponding to a number of storage mediums belong to the RAID group.

2. An encryption method comprising:
   encrypting data stored in a storage medium that belongs to a Redundant Array of Inexpensive Disks (RAID) group;
   writing the encrypted data to a spare storage medium that does not belong to the RAID group;
   copying, after the writing is completed at the encrypting, the encrypted data written to the spare storage medium at the encrypting, to the storage medium;
   changing, before the encryption is started at the encrypting, encryption information for the spare storage medium from information that is indicative of being unencrypted to information that is indicative of being encrypted;
   changing, after the writing is completed at the encrypting, the encryption information for the spare storage medium from the information that is indicative of being encrypted to information that is indicative of having been encrypted;
   changing encryption information for the storage medium from the information that is indicative of being unencrypted to the information that is indicative of being encrypted; and
   changing, after the copying is completed at the copying, the encryption information for the storage medium from the information that is indicative of being encrypted to the information that is indicative of having been encrypted,
   wherein the spare storage medium is one of a plurality of spare storage mediums that do not belong to the RAID group and are prepared corresponding to a number of storage mediums belong to the RAID group.

3. A non-transitory computer readable storage medium having stored therein an encryption program, the encryption program causing a computer to execute a process comprising:
   encrypting data stored in a storage medium that belongs to a Redundant Array of Inexpensive Disks (RAID) group;
   writing the encrypted data to a spare storage medium that does not belong to the RAID group;
   copying, after the writing is completed at the encrypting, the encrypted data written to the spare storage medium at the encrypting, to the storage medium;
   changing, before the encryption is started at the encrypting, encryption information for the spare storage medium from information that is indicative of being unencrypted to information that is indicative of being encrypted;
   changing, after the writing is completed at the encrypting, the encryption information for the spare storage medium from the information that is indicative of being encrypted to information that is indicative of having been encrypted;
   changing encryption information for the storage medium from the information that is indicative of being unencrypted to the information that is indicative of being encrypted; and
   changing, after the copying is completed at the copying, the encryption information for the storage medium from the information that is indicative of being encrypted to the information that is indicative of having been encrypted,
   wherein the spare storage medium is one of a plurality of spare storage mediums that do not belong to the RAID group and are prepared corresponding to a number of storage mediums belong to the RAID group.

* * * * *

UNITED STATES PATENT AND TRADEMARK OFFICE
CERTIFICATE OF CORRECTION

PATENT NO.        : 8,782,428 B2
APPLICATION NO.   : 12/591797
DATED             : July 15, 2014
INVENTOR(S)       : Mikio Ito et al.

Page 1 of 1

It is certified that error appears in the above-identified patent and that said Letters Patent is hereby corrected as shown below:

On the Title Page,

Column 2, Item [56] References Cited (Other Publications), Line 1, Delete "JP20017" and insert -- JP2007 --, therefor Signed and Sealed this
Fourth Day of November, 2014

Michelle K. Lee
*Deputy Director of the United States Patent and Trademark Office*